United States Patent
Schindler et al.

(10) Patent No.: US 9,205,874 B2
(45) Date of Patent: Dec. 8, 2015

(54) WHEEL SUSPENSION FOR A MOTOR VEHICLE

(71) Applicant: AUDI AG, Ingolstadt (DE)

(72) Inventors: Andreas Schindler, Ingolstadt (DE); Dominik Mohrlock, Ingolstadt (DE); Joachim Schmitt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/262,107

(22) Filed: Apr. 25, 2014

(65) Prior Publication Data

US 2014/0319787 A1 Oct. 30, 2014

(30) Foreign Application Priority Data

Apr. 27, 2013 (DE) .................. 10 2013 007 355

(51) Int. Cl.
*B62D 27/02* (2006.01)
*B60G 3/20* (2006.01)
*B60G 7/00* (2006.01)
(Continued)

(52) U.S. Cl.
CPC *B62D 27/02* (2013.01); *B60G 3/20* (2013.01); *B60G 7/00* (2013.01); *B60G 11/182* (2013.01); *B60G 17/025* (2013.01); *B60G 21/0555* (2013.01); *B62D 21/02* (2013.01); *B60G 2200/184* (2013.01); *B60G 2200/422* (2013.01); *B60G 2202/13* (2013.01); *B60G 2202/135* (2013.01); *B60G 2202/42* (2013.01); *B60G 2202/442* (2013.01); *B60G 2204/122* (2013.01); *B60G 2204/143* (2013.01); *B60G 2204/148* (2013.01); *B60G 2204/4307* (2013.01); *B60G 2204/4308* (2013.01); *B60G 2206/427* (2013.01); *B60G 2206/604* (2013.01)

(58) Field of Classification Search
CPC .......... B62D 27/02; B62D 21/02; B60G 7/00; B60G 11/182; B60G 3/20; B60G 17/025; B60G 21/0555; B60G 21/0551; B60G 2202/134; B60G 2202/135; B60G 2202/442; B60G 2202/1362; B60G 2204/122; B60G 2204/4308; B60G 2204/4307; B60G 11/181
USPC ........................................... 267/187
See application file for complete search history.

(56) References Cited

U.S. PATENT DOCUMENTS 2,952,454 A * 9/1960 Muller et al. .................. 267/189
3,586,346 A * 6/1971 Sautter .................... 280/124.153
(Continued)

FOREIGN PATENT DOCUMENTS

DE 102 14 372 C1 7/2003
DE 10 2007 007 214 A1 8/2008
(Continued)

*Primary Examiner* — Ruth Ilan
*Assistant Examiner* — Timothy Wilhelm
(74) *Attorney, Agent, or Firm* — Henry M. Feiereisen LLC

(57) ABSTRACT

A wheel suspension for a two-track motor vehicle includes a multi-link assembly having control arms that are articulated on a vehicle body and on a wheel carrier, a rotary actuator for an active suspension control system, with a motor-gear-unit constructed to transfer torques as actuating forces to the multi-link assembly via a torsion rod, and at least one reinforcing brace independent of the multi-link assembly and disposed on a side of the vehicle body and extending below the multi-link assembly, as viewed in a vertical direction of the vehicle body. The reinforcing brace delimits downwardly in the vehicle's vertical direction a free space, in which the rotary actuator is at least partially arranged.

20 Claims, 5 Drawing Sheets

(51) Int. Cl.
*B60G 11/18* (2006.01)
*B60G 17/02* (2006.01)
*B60G 21/055* (2006.01)
*B62D 21/02* (2006.01)

(56) References Cited

U.S. PATENT DOCUMENTS

| | | | |
|---|---|---|---|
| 7,090,290 B2 | 8/2006 | Neumeier et al. | |
| 8,052,161 B2 * | 11/2011 | Preukschat et al. | .... 280/124.167 |
| 2011/0278811 A1 | 11/2011 | Ohletz et al. | |
| 2011/0308166 A1 | 12/2011 | Binder et al. | |
| 2012/0144646 A1 | 6/2012 | Bartsch et al. | |
| 2013/0069330 A1 | 3/2013 | Langhoff et al. | |

FOREIGN PATENT DOCUMENTS

| | | |
|---|---|---|
| DE | 10 2009 005 898 A1 | 7/2010 |
| DE | 10 2009 052 877 A1 | 5/2011 |
| DE | 10 20011 009 104 A1 | 7/2012 |
| DE | 10 2011 018 574 A1 | 10/2012 |
| EP | 1 184 215 A2 | 4/2001 |

* cited by examiner

WHEEL SUSPENSION FOR A MOTOR VEHICLE

CROSS-REFERENCES TO RELATED APPLICATIONS

This application claims the priority of German Patent Application, Serial No. 10 2013 007 355.3, filed Apr. 27, 2013, pursuant to 35 U.S.C. 119(a)-(d), the content of which is incorporated herein by reference in its entirety as if fully set forth herein.

BACKGROUND OF THE INVENTION

The present invention relates to a wheel suspension for a motor vehicle, especially for a vehicle rear axle with non-steered vehicle wheels.

In an active suspension control, each wheel suspension of a vehicle axle, in particular a rear axle, may each have a rotary actuator. With the two rotary actuators of the vehicle axle, the vehicle level and/or pitch and roll of the vehicle of the vehicle can be compensated depending on the control.

It would be desirable and advantageous to obviate prior art shortcomings and to provide an improved wheel suspension for a motor vehicle, which reduces packaging problems in the vehicle axle in spite of the use of an active suspension control.

SUMMARY OF THE INVENTION

According to one aspect of the present invention, a wheel suspension for a two-track motor vehicle includes a multi-link assembly having control arms which are articulated on a vehicle body and on a wheel carrier, a rotary actuator for an active suspension control system, with a motor-gear-unit constructed to transfer torques as actuating forces to the multi-link assembly via a torsion rod, and at least one reinforcing brace independent of the multi-link assembly and disposed on a side of the vehicle body and extending below the multi-link assembly, as viewed in a vertical direction of the vehicle body, wherein the at least one reinforcing brace delimits downwardly in the vehicle's vertical direction a free space, in which the rotary actuator is at least partially arranged.

The invention is based on the recognition that for increasing the connection or bending rigidity of the rear section of the vehicle reinforcing braces are provided, which extend in the vehicle's vertical direction on the bottom side below the multi-link arrangement. So as not to impair the vehicle's ground clearance and to save space, the reinforcing braces are arranged in brace channels that are open toward the bottom. In other words, the reinforcing braces extend in the brace channels without impairing the vehicle's ground clearance. Advantageously, diagonal and mirror-symmetrically arranged reinforcing braces may be provided with reference to the vehicle's longitudinal center plane. These may each extend, for example, in the interior from a respective side rocker panel rearward to the spare-wheel well.

According to the present invention, these already provided brace channels will be used in the arrangement of the rotary actuator. The rotary actuator is at least partially disposed in a free space above the reinforcement brace. The torsion rod and/or the motor-gearbox unit of the rotary actuator may advantageously be arranged with an axial orientation, i.e. in alignment with the reinforcement brace. The existing brace channel which is open toward the bottom may be expanded to a torsion rod channel having an enlarged cross-section that provides a large enough space for placement of the torsion rod. This means that the fuel tank and/or the spare-wheel well both have at the bottom side a downwardly open torsion rod channel as free space, as well as a brace channel which optionally extends the torsion rod channel and in which the reinforcement brace extends.

The torsion rod may advantageously substantially extend over the entire length of the reinforcement brace. This significantly increases the effective spring length of the rotary actuator, so that a soft torsion rod can be provided with simple means.

Advantageously, the space-intensive motor-gearbox unit of the rotary actuator may project into another free space which is delimited by the control arms of the multi-link assembly in the vehicle longitudinal direction toward the front and/or toward the rear.

Advantageously, the free space for the motor-gearbox unit of the rotary actuator is delimited in the vehicle's longitudinal direction toward the front and/or toward the rear between a first control arm and a second control arm. The first and second control arms may each be the lower control arms of a five-link assembly. In such a multi-link assembly, the control arms may be arranged in a respective upper control arm plane and in a lower control arm plane. Accordingly, the free space for the motor-gearbox unit may advantageously be disposed between two control arms in the lower control arm plane.

The torsion rod which can be actuated by the motor-gearbox-unit may support an output lever, which is connected in an articulated manner via a tie rod on one of the control arms. In this way, the torques generated in the motor-gearbox-unit can ultimately be transferred to the vehicle wheel as linear actuating forces via the load path motor/gearbox/torsion rod/drive lever/tie rod/control arm/vehicle wheel. In the case of the above-mentioned five-link assembly, the output lever and the tie rod may engage on a control arm of the upper control arm plane and may be located below this upper control arm.

The free space for the motor-gearbox-unit may be delimited toward the top by at least one upper control arm, to which actuating forces are applied, for example, via the rotary actuator. As viewed in the vehicle's longitudinal direction, this upper control arm may be disposed between the first lower control arm and the second lower control arm.

To conserve space, the motor-gearbox-unit of the rotary actuator, at least its reduction gearbox, may advantageously be arranged coaxially with the torsion rod. The torsion rod may also, together with the motor-gearbox-unit, be aligned in the vehicle's longitudinal direction. In this case, the output lever projecting at a right angle from the torsion rod may protrude into the free space for the motor-gearbox-unit.

In another embodiment, the motor of the rotary actuator may not be arranged coaxially, but instead with a radial distance from the torsion rod. The motor may also drive the reducing gear that is coaxial with the torsion rod via an intermediate gearbox. In this way, the motor, in particular an electric motor, can be positioned regardless of the reducing gear, depending on the space requirements. Especially a motor that spatially separated from the reducing gear can advantageously be arranged in the above-mentioned free space of the multi-link assembly.

In a particularly compact design of the multi-link assembly, the tie rod can run vertically upwards and be connected with the upper arm of the multi-link assembly by an articulated joint. The articulated joint between the tie rod and the upper control arm can be arranged, in particular in the compressed state of the vehicle, in the vehicle's transverse direction outside of a vehicle's longitudinal rail with a transverse clearance. The upper control arm may extend in the vertical direction below the vehicle's longitudinal rail. To provide a vertical clearance for the vehicle's longitudinal rail, the upper control arm may be curved downwards, with arc sections converging at a lower apex point. The apex point may be spaced from the vehicle's longitudinal rail in the compressed state of the vehicle by a vertical clearance.

The intermediate gearbox stage may furthermore provide a larger overall gear ratio between the electric motor and to the torsion rod. The electric motors can therefore be designed to be smaller and have less weight. Advantageously, the reduction gear coaxial with the gearbox and the spaced-apart motor of the motor-gearbox-unit may each be arranged in individual housings. The intermediate gearbox may be, for example, a belt drive or a spur gear in order to produce the necessary radial offset between the motor and the torsion rod.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
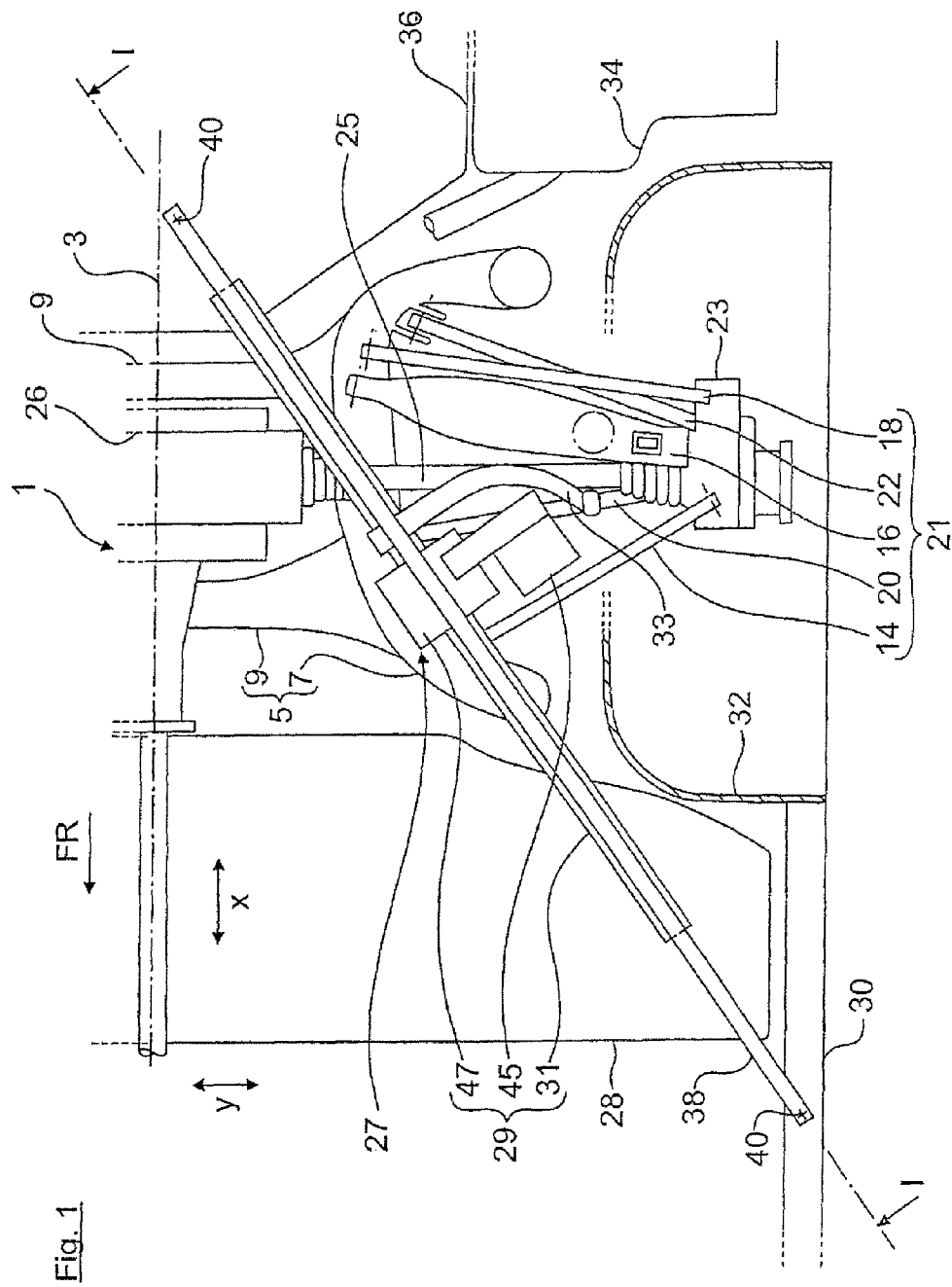
FIG. 1 shows a partial view from below of the multi-link assembly of the wheel suspension according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in a partial view from below a rear axle 1 for a two-track motor vehicle, which is described only to the extent necessary for an understanding of the invention. The rear axle 1 is designed mirror-symmetrically with respect to a longitudinal center plane 3 of the vehicle (FIG. 1). The rear axle 1 has a subframe 5, which is composed of longitudinal rails 7 as well as of front and rear transverse beams 9. The subframe 5 is connected on a vehicle body shell in a conventional manner. Lower control arms 14, 16, 18, and upper control arms 20, 22 for the wheel suspension are articulated in spaced offset arrangement on the longitudinal rail 7 of the subframe 5 by way of on control arm bearings (not illustrated in detail). The control arms 14 to 22 extend in the vehicle's transverse direction y outwardly to the wheel carrier 23, which supports an unillustrated rear wheel of the motor vehicle. In the present exemplary embodiment, the rear wheel is driven by a propeller shaft 25, which is guided to a rear-axle differential 26 suspended on the subframe 5. A cardan shaft is connected at the rear-axle differential 26.

As further shown in FIG. 1, a vehicle fuel tank 28 is provided before the rear axle 1, as viewed in the vehicle's longitudinal direction x, which is abutted by an outwardly oriented side door rocker panel 30 in the vehicle's transverse direction y. The door rocker panel 30 extends rearward in the vehicle's longitudinal direction x to a wheel housing 32, in which the unillustrated rear wheel is arranged. An end muffler 34 of an exhaust system is connected farther rearward. According to FIG. 1, a spare-wheel well 36 is arranged directly behind the rear axle 1 is provided at the center of the vehicle at approximately the same height.

To increase the rigidity of the vehicle rear carriage, a reinforcing brace 38 is provided in FIG. 1 which is attached to attachment points 40 on the side rocker panel 30 and on the bottom side on the spare-wheel well 36. The reinforcing brace 38 extends from the side door rocker panel 30 diagonally inwardly to the rear in the vehicle's transverse direction y.

As is further evident from FIG. 1, a rotary actuator 27 for an active suspension control is provided on the longitudinal subframe rail 7. The rotary actuator 27 has a motor-gearbox unit 29, which is drivingly connected with a torsion rod 31. The torsion rod 31 is connected for force transmission with an output lever 33 which is connected via a tie rod 35 (FIG. 4) in an articulated joint 37 with an upper lever 20 of the multi-link assembly 21.

The lower first control arm 14 which is in front in the direction of travel FR and the lower second control arm 16 arranged behind the first control arm 14 converge in the vehicle's transverse direction y inwardly in form of a wedge, namely by forming a free space 39 (FIG. 2), into which the motor-gearbox unit 29 of the rotary actuator 27 partially protrudes. According to FIGS. 1 and 2, a schematically shown support spring 41 and a schematically shown telescopic shock absorber 43 are each supported on the second lower control arm 16.

Figure 2:
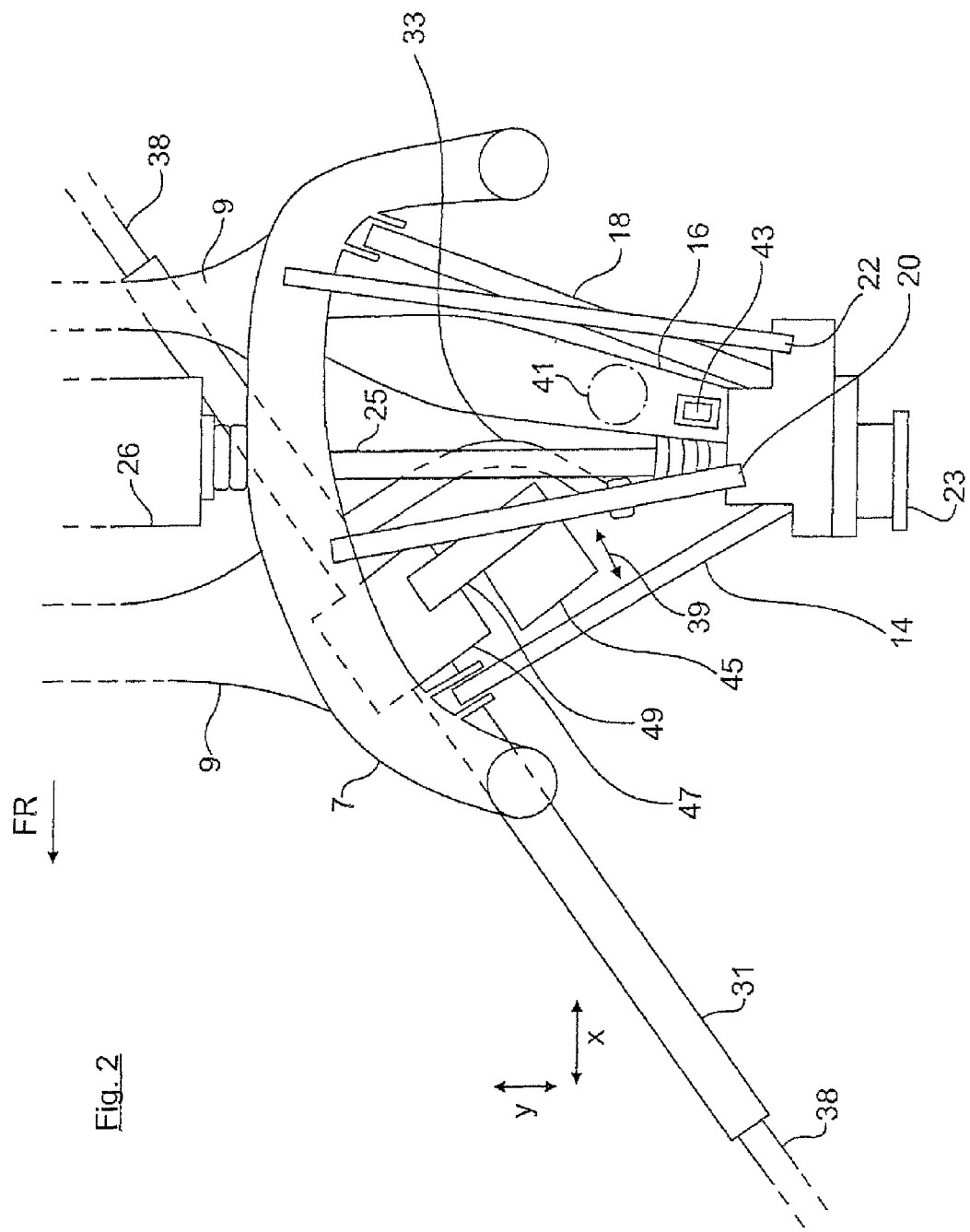
FIG. 2 shows a partial view from above of the multi-link assembly of the wheel suspension according to the present invention.

The motor-gearbox-unit 29 has according to the Figures a reduction gear 45 arranged coaxially with the torsion rod 31 provided and an electric motor 47 which has a radial axis offset r (FIG. 4) from the torsion rod 31 and which is in driving connection with the reduction gear 45 via an intermediate gearbox 49 (FIG. 2). The housing of the reduction gear 45 of the rotary actuator 27 is rigidly attached in an unillustrated manner on the rigid longitudinal subframe rail 7 such that the torsion rod 31 of the rotary actuator 27 is aligned with the course of the reinforcement path 38. The entire rotary actuator 27 is positioned below the longitudinal subframe rail 7 and below the articulated shaft 25. Starting from the reduction gear 45, the intermediate gear stage 49 together with the electric motor 47 thereby extends completely into the free space 39 between the two lower control arms 14, 16.

The free space 39 between the two lower control arms 14, 16 is delimited in the vertical direction z toward the top by the upper control arm 20 of the multi-link assembly 21. The two upper control arms 20, 22 of the multi-link assembly 21 are each arranged in an upper control arm level, whereas the three lower control arms 14, 16, 18 are positioned in a lower control arm level. The output lever 33 and the tie rod 35 are in this case approximately aligned below the upper control arm 20, wherein the tie rod 35 is oriented substantially vertically upwards.

Figure 4:
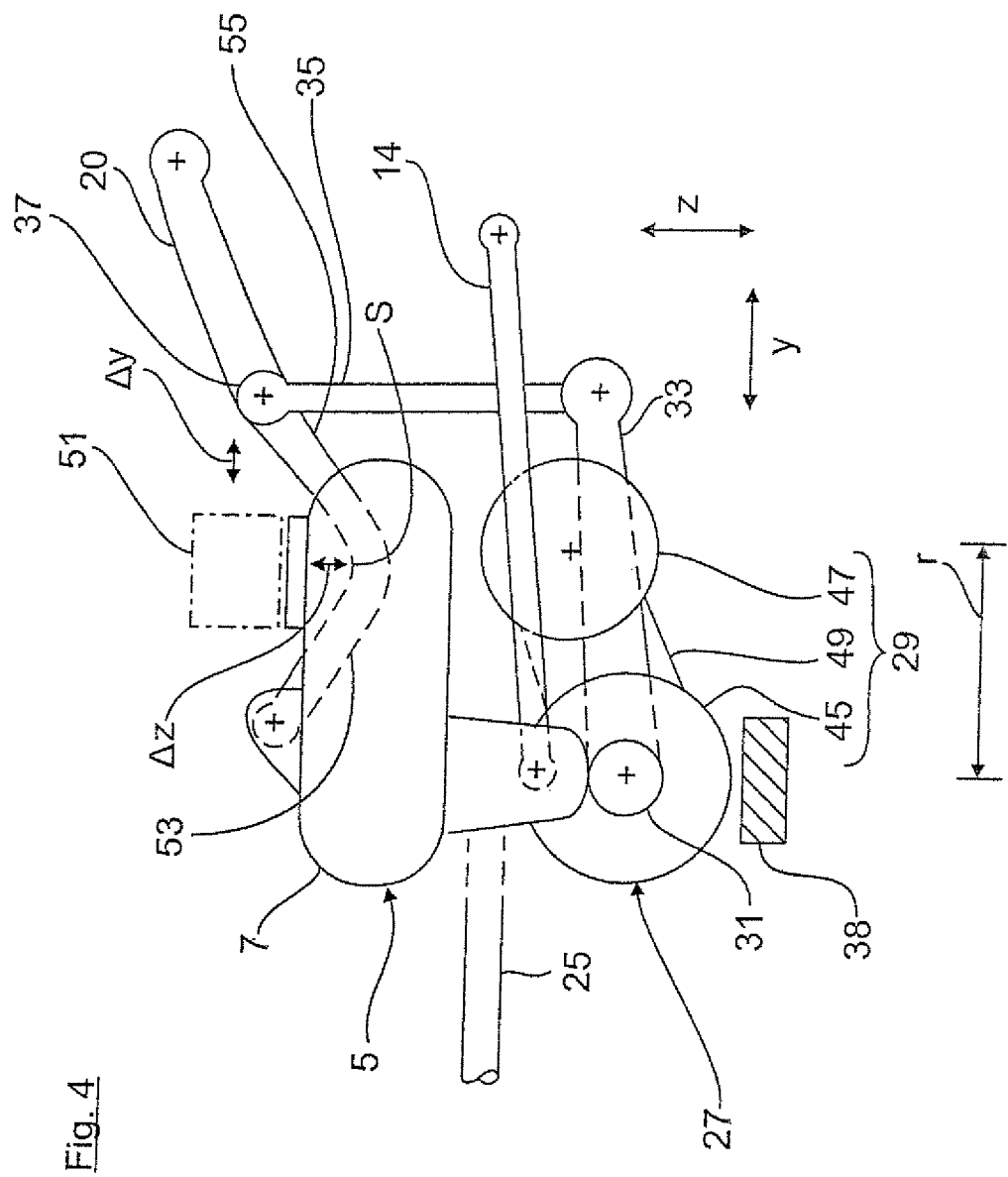
FIG. 4 shows a partial front view of the multi-link assembly of the wheel suspension according to the present invention.

FIG. 4 shows the wheel suspension in a compressed state of the motor vehicle. Accordingly, the articulated joint 37 between the tie rod 35 and the front upper control arm 20 is arranged in the vehicle's lateral direction y outside the vehicle's longitudinal rail 51 by a transverse clearance Δy. The control arm 20 extending below the vehicle's longitudinal rail 51 is curved downward in approximately a V-shape so as to provide a large enough vertical clearance Δz. The V-shaped curvature has according to FIG. 4 two arc portions 53, 55 converging at a lower apex point S. The lower apex point S of the control arm 20 is hereby spaced apart by the aforementioned vertical clearance Δz from the bottom side of the vehicle's longitudinal rail 51.

Figure 3:
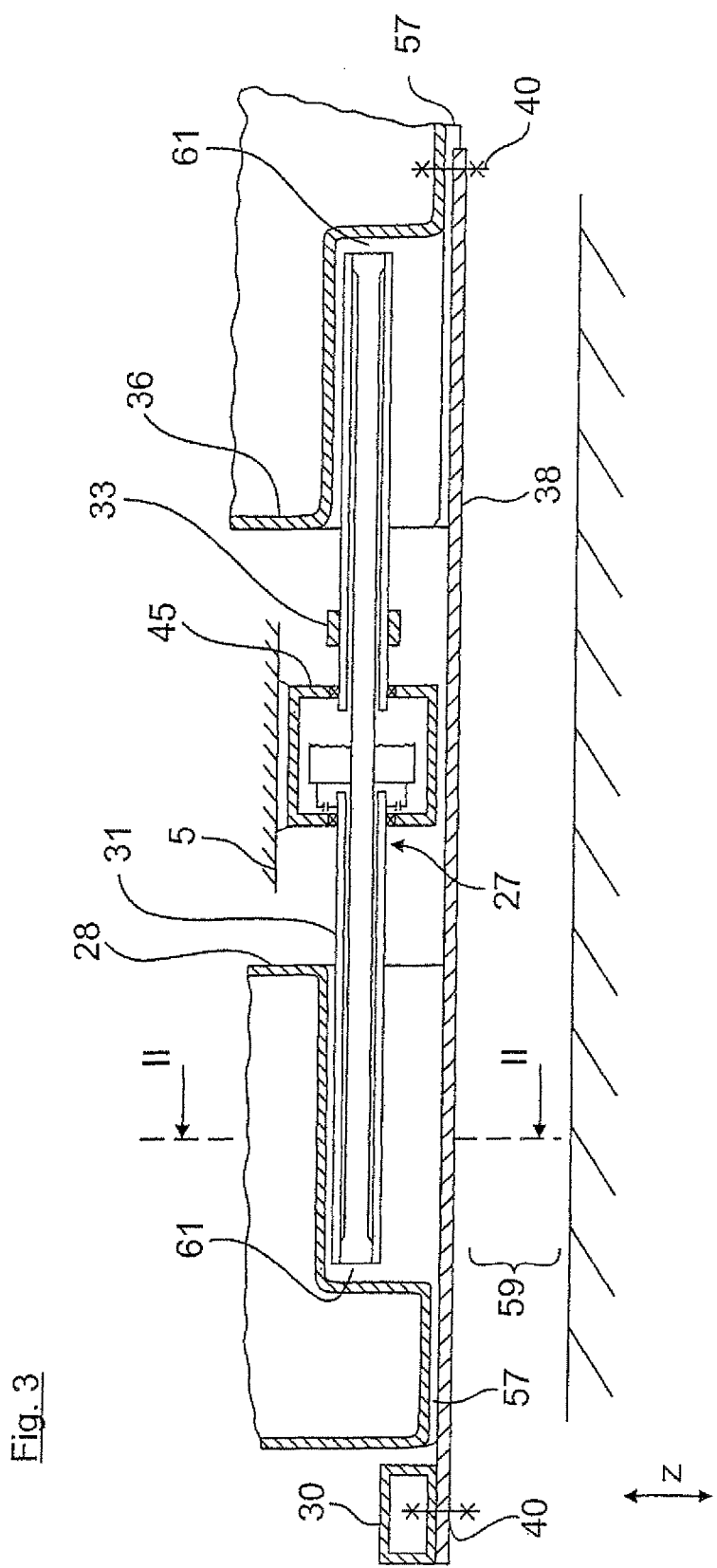
FIG. 3 shows a sectional view taken along the section plane I-I of FIG. 1.
Figure 5:
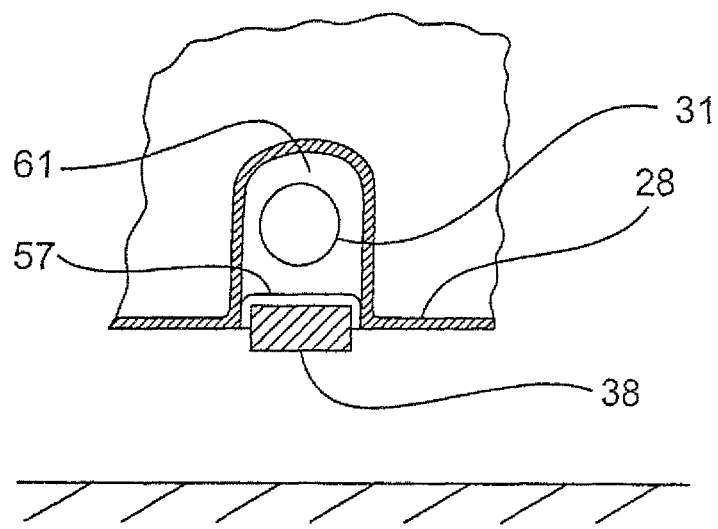
FIG. 5 shows a sectional view along the section plane II-II of FIG. 3.

As is evident from the Figures, the rotary actuator 27 is aligned with its torsion rod 31 with the reinforcement brace 38. The torsion rod 31 together with the motor-gear-unit 29 extend along in the vehicle's vertical direction z above the reinforcement brace 38, which extends according to FIGS. 3 and 5 in a brace channel 57 which is formed in both in the fuel tank 28 and in the spare-wheel well 36 and which is open downwardly on the bottom side. The braces channel 57 forms a free space in which the reinforcing brace 38 is largely arranged so that a ground clearance 59 of the vehicle is not impaired. According to FIGS. 3 and 5, the brace channel 57 is expanded in the region of the torsion rod 31 to a likewise downwardly open torsion rod channel 61. The cross section of the torsion rod channel 61 is designed so that the torsion rod 31 is completely disposed therein.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A wheel suspension for a two-track motor vehicle, comprising
   a multi-link assembly comprising control arms which are articulated on a vehicle body and on a wheel carrier,
   a rotary actuator for an active suspension control system, comprising a motor-gear-unit constructed to transfer torques as actuating forces to the multi-link assembly via a torsion rod, said torsion rod oriented substantially in a transverse direction of the motor vehicle, and
   at least one reinforcing brace independent of the multi-link assembly and extending in alignment with the torsion rod below the multi-link assembly, as viewed in a vertical direction of the vehicle body, wherein a first end of the at least one reinforcing brace is attached at a first location on a side of the vehicle body and a second end of the at least one reinforcing brace is attached at a different second location of the vehicle body, with the at least one reinforcing brace defining a lower boundary of a free space downwardly in the vehicle's vertical direction, in which free space the rotary actuator is at least partially arranged.

2. The wheel suspension of claim 1, wherein the control arms are articulated on a subframe of the vehicle body.

3. The wheel suspension of claim 2, wherein the subframe comprises longitudinal rails and transverse rails, and wherein the motor-gear-unit is arranged underneath one of the longitudinal rails.

4. The wheel suspension of claim 1, wherein at the motor-gear-unit is oriented in alignment with the reinforcing brace.

5. The wheel suspension of claim 1, wherein the at least one reinforcing brace is attached on the vehicle body in the vehicle's longitudinal direction in front of the multi-link assembly and behind the multi-link assembly.

6. The wheel suspension of claim 5, wherein a fuel tank is arranged in the vehicle's longitudinal direction in front of the multi-link assembly, and wherein at least one of the fuel tank and a spare-wheel well has a torsion rod channel which is open on a bottom side and forms the free space, with the torsion rod of rotary actuator protruding into the free space.

7. The wheel suspension of claim 6, wherein at least one of the fuel tank and the spare-wheel well have a brace channel, which is downwardly open on a bottom side and has a reduced cross-section compared to the torsion rod channel.

8. The wheel suspension of claim 1, wherein the first end of the at least one reinforcing brace is attached to a side rocker panel.

9. The wheel suspension of claim 1, wherein the second end of the at least one reinforcing brace is attached on a spare-wheel well.

10. The wheel suspension of claim 1, wherein the motor-gear-unit of the rotary actuator is at least partially arranged in an additional free space disposed in the vehicle's longitudinal direction between a first control arm and a second control arm.

11. The wheel suspension of claim 10, wherein the first control arm and the second control arm are lower control arms of the multi-link assembly.

12. The wheel suspension of claim 11, wherein the additional free space for the motor-gear-unit is delimited upwardly by an upper control arm.

13. The wheel suspension of claim 11, wherein the upper control arm is arranged in the vehicle's longitudinal direction between the first lower control arm and the second lower control arm.

14. The wheel suspension of claim 10, wherein at least a motor of the motor-gear-unit is arranged in the additional free space.

15. The wheel suspension of claim 1, further comprising an output lever supported by the torsion rod of the rotary actuator and coupled via a tie rod to an upper control arm of the multi-link assembly.

16. The wheel suspension of claim 15, wherein the output lever and the tie rod are arranged below the upper control arm.

17. The wheel suspension of claim 1, wherein the motor-gear-unit of the rotary actuator is arranged coaxially in relation to the torsion rod.

18. The wheel suspension of claim 1, wherein a gearbox of the motor-gear-unit of the rotary actuator is arranged coaxially in relation to the torsion rod.

19. The wheel suspension of claim 1, wherein an axis of a motor of the motor-gear-unit is offset with a radial spacing from an axis of the torsion rod.

20. The wheel suspension of claim 19, wherein the motor drives a gearbox of the motor-gear-unit via an intermediate gear stage.

* * * * *